Nov. 17, 1959 — D. E. GRISWOLD — 2,912,997
FLOW CONTROL VALVE
Filed June 8, 1954 — 2 Sheets-Sheet 1

INVENTOR
David E. Griswold
BY Bacon + Thomas
ATTORNEYS

Nov. 17, 1959  D. E. GRISWOLD  2,912,997
FLOW CONTROL VALVE
Filed June 8, 1954  2 Sheets-Sheet 2

INVENTOR
David E. Griswold
BY Bacon + Thomas
ATTORNEYS

United States Patent Office 2,912,997
Patented Nov. 17, 1959

2,912,997

FLOW CONTROL VALVE

David E. Griswold, San Marino, Calif., assignor to Donald G. Griswold, Alhambra, Calif.

Application June 8, 1954, Serial No. 435,207

15 Claims. (Cl. 137—456)

The present invention relates to valves and, more particularly, to flow control valves constructed to automatically close in response to a predetermined minimum pressure in an associated pipe line. More specifically, the invention relates to safety valves for automatically stopping the flow of fluid in a pipe line in the event of an abnormal drop in line pressure due to rupture or other failure in the downstream piping.

The safety valve apparatus of this invention includes a fluid pressure operable main valve adapted to be placed in a pipe line, an automatic pressure-responsive pilot valve operable at a predetermined pressure in the pipe line to close the main valve and keep it closed until the downstream trouble can be located and corrected, and a manually operated valve for permitting the main valve to reopen and resume normal operation under the automatic control of the pilot valve after the trouble has been corrected. The valve apparatus is constructed so that the main valve will remain closed until the manually actuated valve is operated. This acts as an important safety measure ensuring that the flow through the pipe line will not be resumed until after the trouble in the pipe line has been repaired and the manually operable control has been actuated to place the main valve back in service.

The principal object of this invention is to provide fully automatic safety valve apparatus for stopping the flow of fluid in a pipe line in response to a predetermined minimum pressure in the pipe line.

Another object of the invention is to provide automatic safety valve apparatus which will stop the flow of fluid in a pipe line in response to an abnormal drop in pressure downstream and which will continue to stop the fluid flow until after the trouble has been located and corrected and the safety valve apparatus has been reset.

Another object of the invention is to provide safety valve apparatus for automatically stopping the flow of fluid through a pipe line in response to an abnormal drop in pressure downstream from this apparatus and to further provide means for quickly and conveniently resetting the safety valve apparatus after the trouble in the pipe line has been corrected.

Another object of the invention is to provide safety valve apparatus including a fluid pressure operable main valve and a pressure responsive pilot valve which is operable in response to an abnormal drop in pressure downstream of the main valve to cause fluid pressure upstream of the main valve to actuate and maintain the main valve closed.

Other objects and advantages of the invention will be apparent from the following description taken in conjunction with the accompanying drawings in which.

Figure 1:
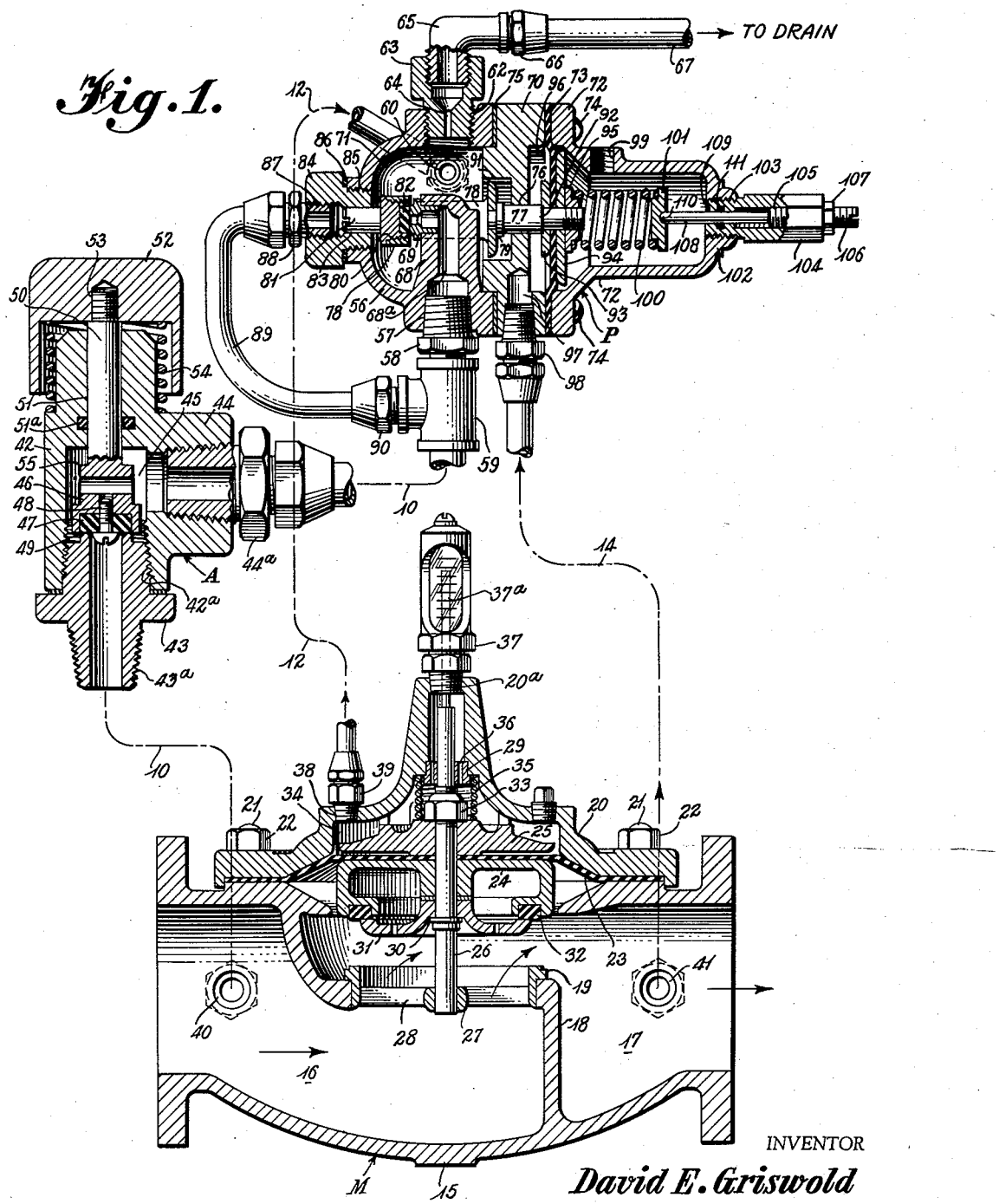
Figure 1 is an elevational view illustrating the main valve and control valves partially in section with the parts thereof in the relative positions they assume during normal flow of fluid through the main valve, and further showing diagrammatically the connections between the main valve and the control valves.

Referring to the drawings in detail, the main valve is generally indicated by the letter M, the manually operated valve by the letter A, and the pilot valve by the letter P. The inlet side of the main valve M is connected by means of a conduit shown diagrammatically by the dot-dash line 10 through the manually operated valve A to the pilot valve P which in turn is connected to the pressure chamber of the main valve M through a conduit shown diagrammatically by the dot-dash line 12. The outlet side of the main valve M is connected to the pressure control chamber of pilot valve P through a conduit shown diagrammatically by the dot-dash line 14.

The main valve M comprises a body 15 provided with an inlet chamber 16 and an outlet chamber 17. A partition 18 in the valve body 15 separates the chambers 16 and 17 and serves as a support for a valve seat 19. A cover 20 is secured to the valve body 15 by means of a plurality of studs 21 and nuts 22, a flexible conventional diaphragm 23 being interposed between said valve body and cover. A diaphragm supporting plate 24 is disposed in the body 15 below the diaphragm 23 and another supporting plate 25 is disposed in the cover 20 above said diaphragm. A valve stem 26 extends through the diaphragm 23 and in supporting plates 24 and 25 and is slidably mounted at its lower end in guide 27 supported by arms 28 connected with the seat 19. The upper end of the valve stem 26 is guided in a bushing 29 mounted in the cover 20. The stem 26 has a shoulder 30 disposed above the guide 27 which serves as an abutment for the disk 31. The supporting plate 24 has an annular groove formed in the lower face thereof in which a sealing ring 32 is disposed and held in place by the outer marginal portion of the disk 31. The stem 26 is threaded in the region of the plate 25 and a self-locking nut 33 is threaded thereon to secure the diaphragm 23, supporting plates 24 and 25, disk 31 and sealing rings 32 in assembled relation. The sealing ring 32 is cooperable with the seat 19 to control the flow of fluid through the main valve M. The valve cover 20 and diaphragm 23 define a pressure chamber 34 in the main valve. A compression spring 35 is disposed in the chamber 34 between the cover 20 and the plate 25 and constantly tends to urge the valve stem 26 downwardly to its valve closed position against the line pressure. Channels 36 in the bushing 29 which holds the valve stem 26 in alignment permits the equalization of pressure above the valve stem with pressure in chamber 34. The valve cover 20 has a central threaded opening 20a in concentric relation to the valve stem 26 in which is mounted a conventional indicating gauge 37 for indicating whether the valve is open or closed. Valve stem extension 37a slidably operable in the gauge 37 serves as an indicating means.

The valve cover 20 is also provided with a threaded opening 38 for accommodating a conventional fitting 39 which is connected through the conduit line 12 to the pilot valve P in a manner hereinafter to be described. The inlet chamber 16 of the main valve M is provided with a threaded opening 40 to accommodate a conventional fitting to which is connected the line 10. The outlet chamber 17 of the main valve M is likewise provided with a threaded opening 41 to accommodate a conventional fitting which is connected to the pilot valve P by means of line 14.

Figure 2:
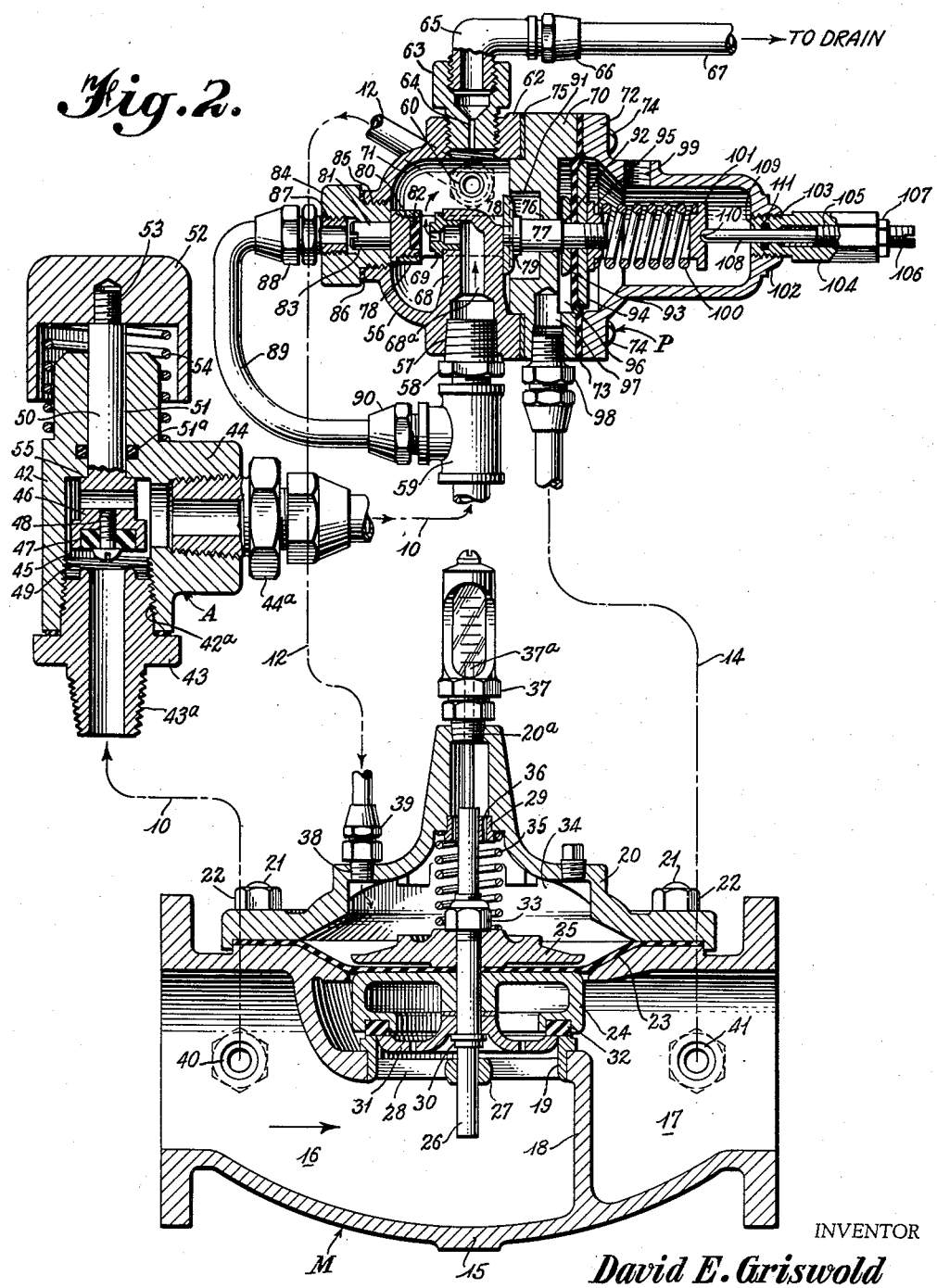
Figure 2 is an elevational view similar to Figure 1 but showing the parts of the main valve and control valves in the relative positions they assume when the main valve is fully closed.

The manually controlled valve A in the line 10 between the inlet chamber 16 of the valve M and the pilot valve P has a body portion 42 provided with a threaded opening 42a which accommodates a fitting 43 having a threaded external portion 43a for connecting one side of the line 10. The body portion 42 is further provided with an internally threaded lateral boss 44 to which the other side of line 10 is connected by means of conventional fitting 44a. The body 42 has a central chamber 45 accommodating a closure member 46 having a washer or disk 47 secured in the recessed end thereof by means of screw 48 and which, in cooperation with seat 49 in fitting 43, acts to close the valve. The closure member 46 is provided with a stem 50 slidable in an opening 51 in the valve body 42. O-ring 51a serves as packing to prevent leakage around the valve stem. A push button 52 threadedly secured to valve stem 50 as at 53 permits manual operation of the valve closure against the compressional force of a spring 54 between the valve body 42 and lower face of push button 52 which continuously tends to urge the closure 46 off its seat 49. The spring 54 normally holds the valve closure member 46 in the open position as shown in Figure 2. A shoulder 55 on the valve closure member 46 in cooperation with valve body 42 limits the distance through which the valve may be opened. Upon actuation of the valve by pushing the button 52 down, the disk 47, in cooperation with seat 49 in the fitting 43, acts to stop the flow of fluid through chamber 45.

The pilot valve P comprises a body 56 having a threaded inlet opening 57 which accommodates a conventional pipe fitting 58 to which the line 10 is connected through T 59. The body 56 also has a threaded outlet opening 60 in which another conventional fitting is mounted and to which is connected the line 12. The valve body 56 is additionally provided with a threaded opening 62 in which is mounted a fitting 63 having a restricted orifice 64. The fitting 63 is further connected by means of conventional pipe fittings 65 and 66 to discharge piping 67. An extension 68 defining a passageway 68a extends from the inlet opening 57 and has a seat 69 mounted on the side thereof. A partition 70 in cooperation with the valve body 56 defines a chamber 71 adapted to hold operating fluid for the main valve. A valve cover 72 is mounted on the partition 70 and a conventional diaphragm 73 is held between the cover 72 and partition 70. Bolts 74 hold the valve cover 72, diaphragm 73, partition 70 and valve body 56 in assembled relation. A gasket 75 between partition 70 and valve body 56 ensures a liquid-tight seal. The partition 70 is provided with a central opening 76 in which a valve stem section 77 is slidably mounted. A yoke 78 is welded or otherwise affixed to the valve stem member 77 as indicated at 79. The yoke 78 surrounds the inner end of the inlet extension 68 and has a threaded opening 80 at its lower end in which the inner end of a second stem part 81 is mounted. The stem part 81 has an outer end of the same diameter as the portion of the stem part 77 which slides in the opening 76. The stem part 81 is recessed on its inner face to receive a valve disk 82 cooperable with the seat 69 to control the flow between the inlet opening 57 and the outlet opening 60 of the pilot valve P. The outer end of the stem part 81 is slidably mounted in a passage 83 formed in a plug 84 mounted in a threaded opening 85 in the valve body 56. A gasket 86 is disposed between the valve body 56 and the head of the plug 84 to form a liquid-tight seal. The plug 84 is provided with a threaded opening 87 which accommodates a conventional fitting 88 to which is connected conduit 89 which communicates by means of a conventional fitting 90 with the T 59 in the line 10. This provides a pressure equalizing means between the head of the valve stem 81 and the chamber 71.

The yoke 78, carried by valve stems 77 and 81, is operable in a recessed portion 91 of the partition 70. The valve stem 77 is further provided with a shoulder 92 disposed beyond the partition 70 and adapted to form an abutment for a lower diaphragm supporting plate 93 on the left side of the diaphragm 73. A somewhat larger plate 94 is mounted upon the stem 77 to the right of the diaphragm 73 and a retaining nut 95 is mounted upon the outer threaded end of the stem 77 to maintain the diaphragm supporting plates 93 and 94 and the diaphragm 73 in assembled relation with the valve stem part 77. The valve partition 70 is recessed to provide a pressure chamber 96 at the left side of the diaphragm 73 and a radial passageway 97 formed in this partition communicates with chamber 96. A conventional pipe fitting 98 is mounted in the outer end of passageway 97 and connects the pressure chamber 96 through line 14 to the outlet chamber 17 of the main valve M.

The cover 72 has a threaded opening 99 through which the chamber defined by the cover portion and the diaphragm 73 is vented to the atmosphere. It will be understood that a conventional fitting and vent conduit may be connected in opening 99 if desired. A compression spring 100 is disposed within the cover 72 and its left end is engaged with the retaining nut 95 and its right end is engaged with a disk 101. The cover 72 has an end wall 102 provided with a threaded opening 103 in which a fitting 104 is mounted. The fitting 104 has an internally threaded opening 105 and an adjusting screw 106 is mounted in said opening and retained in adjusted position by a jam nut 107. The lower end 108 of the adjusting screw 106 is plain and cylindrical and projects through a smooth opening 109 in the fitting 104 and into a hemispherical recess 110 formed centrally in the disk 101. A conventional O-ring 111 is carried by the fitting 104 in surrounding relation to the portion 108 of the adjusting screw 106 and forms a seal therewith. By means of adjusting screw 106 the compression of spring 100, which is constantly urging the diaphragm 73 to the left, may be set to any desired value.

The operation of the main valve M and control valves A and P will be best understood by first considering Figure 1, which shows the main valve M in the open position in which it is maintained during normal line service. It will be understood that the main valve would usually be positioned in a pipe line close to the storage source of the fluid to be transferred, in order that it may serve as a safety device for stopping the flow of fluid should a break occur at any point in the downstream piping system which would result in an abnormally low back pressure in the pipe line. Referring now to Figure 1 it is assumed that flow of fluid is passing from left to right through the valve M in the direction of the arrows and that normal back pressure exists in the downstream valve chamber 17. The line pressure through the valve holds the main valve diaphragm 23 flexed upwardly against the pressure of compression spring 33 so that the valve is fully open. The position of the slidable rod 37a of the indicator 37 indicates to the operator that the valve is open. The pressure chamber 34 above the diaphragm is connected by means of opening 38, fitting 39, line 12, and fitting 60 to chamber 71 of the pilot valve P. Since the pilot valve P is closed during normal operating conditions preventing entry of operating fluid into chamber 71 and this chamber is always open to low or atmospheric pressure through the orifiice 64, fitting 65, and line 67, no appreciable fluid pressure is exerted upon the top of the main valve diaphragm 23. It will be understood that line 67 may be connected back to the storage tank or to the suction side of the line pump if it is desired to save the fluid draining through the orifice.

Fluid operating pressure for holding the pilot valve P closed is derived from chamber 17, downstream of the valve closure member, by means of opening 41, conduit line 14, fitting 98, and radial passageway 97 to the chamber 96 at the left of pilot valve diaphragm 73. Fluid pressure in chamber 96 under normal operating conditions holds the pilot valve diaphragm 73 flexed to the right, as shown in Figure 1, against the opposing force of compression spring 100. Since the valve cover 72 is open to the atmosphere through opening 99 the pressure of spring 100 is the only force opposing the fluid pressure in chamber 96. This spring pressure may be adjusted to exert any desired predetermined force by releasing jam nut 107 and turning adjusting screw 106 clockwise for increased compression force or counterclockwise for decreased compression force. Thus, the compressional force on spring 100 may be adjusted to cause the spring 100 to operate the valve when any predetermined minimum back pressure exists in chamber 96. A typical valve has an adjustable range of from 2 to 40 p.s.i. If, for example, the spring is adjusted to a "set" pressure of 30 p.s.i., a drop in back pressure in chamber 96 to a value below 30 p.s.i. causes the spring 100 to operate to flex the diaphragm 73 to the left and thereby open the pilot valve.

As shown in Figure 1, the pilot valve diaphragm 73 in response to pressure in chamber 96 has caused the valve stem 77 and appended yoke 78 to move to the right and hold valve disk 82 in liquid sealed engagement with the valve seat 69 whereby no operating fluid from inlet line 10 may enter the valve chamber 71.

Fluid pressure through pressure equalizer line 89 which is connected by T 59 to the inlet line 10 of the pilot valve acts upon the end of the lower valve stem 81 and tends to balance the pressure exerted on the valve disk 82 by the inlet line pressure. The occurrence of an unbalanced force which would tend to disturb or undesirably influence the operation of the valve by the opposed forces of back pressure in chamber 96 and pressure of spring 100 is thereby prevented.

In Figure 1, the manually operated valve A is shown in closed position. It will be understood that this valve is manually held in closed position only until such time after the main valve is placed in operation that normal flow through the valve M can be established. The reset button 52 is then released whereby the spring 54 causes this valve to open to the position shown in Figure 2. The function of the manual reset valve will be more fully apparent from the description appearing hereinafter.

Assuming now that a break or leak has occurred in the downstream piping in which valve M has been incorporated so that a pressure drop occurs in the outlet chamber 17 whereby the fluid pressure in chamber 96 of the pilot valve drops below the predetermined set value of spring 100. The pilot valve P now automatically operates to close the main valve and the valve parts assume the positions shown in Figure 2. Thus, the force of the spring 100 flexes the pilot valve diaphragm to the left which in turn forces the valve stem 77 to the left causing the valve disk 82 to be moved from the seat 69 permitting the entry of operating fluid from main valve inlet chamber 16 through the open manual reset valve A and line 10 to the pilot valve chamber 71. It will be understood that the open orifice 64 to the pilot valve chamber 71 is of such restricted diameter that entry of operating fluid to this chamber through the valve inlet ports is at a much greater rate than the rate of exit of this fluid through the orifice. Accordingly, fluid pressure quickly builds up in chamber 71 and is communicated to the main valve operating chamber 34 through opening 60, line 12 and opening 38. The force of the operating fluid in chamber 34 in cooperation with the force of compression spring 35 flexes the diaphragm 23 of the main valve downwardly whereby valve stem 26 forces sealing ring 32 into tight engagement with the valve seat 19 thereby preventing further flow of fluid through the valve. The valve indicator stem 37a now indicates that the valve M is closed.

The combined forces acting upon valve M hold this valve closed until the break or other trouble in the line is repaired and the valve is placed back in operation by the use of reset valve A. Assuming now that the trouble has been located and repaired, the operator now manually depresses reset button 52 of valve A against the pressure of spring 54 which normally maintains this valve in an open position. Depression of the button 52 forces valve stem 50 down and causes valve disk 47 to engage seat 49 as shown in Figure 1. The flow of operating fluid through line 10 and pilot valve chamber 71 to the pressure chamber 34 of the main valve M is now prevented. Since orifice 64 to the pilot valve chamber 71 is always open, operating fluid drains out through this orifice and the hydraulic pressure in this chamber and chamber 34 of the main valve is released. Line pressure now causes the main valve to open and normal back pressure again builds up in the main valve outlet chamber 17 and communicating pilot valve chamber 96. As soon as pressure in chamber 96 passes the set minimum pressure the pilot valve diaphragm 73 is flexed to the right and the pilot valve closes thereby preventing flow of operating fluid through the pilot valve to the main valve. The operator may now release the manual reset button since the pilot valve has taken over automatic operation.

It will be fully apparent from the foregoing description that a safety valve apparatus has been provided that operates fully automatically with relatively few moving parts to positively shut off fluid flow through a pipe system in response to a predetermined minimum back pressure in the line, and which keeps the flow shut off until resumed fluid flow is desired. Normal operation is then quickly reestablished and the safety mechanism automatically reset by depressing the reset button long enough for the "set" back pressure to build up.

It will be understood that various changes may be made in the details of construction and in the arrangement of the parts of the main valve and flow control valves disclosed herein, without departing from the principles of the present invention or from the scope of the annexed claims.

I claim:

1. Fluid flow control means, comprising: a fluid pressure operable main valve having an inlet side, an outlet side, a pressure chamber and a closure member moveable to closed position against line pressure at said inlet side by fluid pressure in said pressure chamber; an automatic pressure-responsive pilot valve for controlling the flow of an operating fluid to said pressure chamber, said pilot valve having an inlet and having an outlet connected with said pressure chamber; pressure-responsive means in said pilot valve in communication with the outlet side of said main valve, said pressure-responsive means being operable to urge said pilot valve to a closed position upon actuation by fluid pressure derived from the outlet side of said main valve; means in said pilot valve urging said pilot valve to an open position with a yieldable force of set value so that upon a drop in pressure at the outlet side of said main valve below the set value of said yieldable force the pilot valve automatically opens to enable flow of said operating fluid for closing said main valve; manually operable means disposed on the inlet side of said pilot valve, said manually operable means being operable to interrupt the supply of said operating fluid through said pilot valve to the pressure chamber of said main valve; and manually operable means connected with said pressure chamber for relieving pressure in said pressure chamber, whereby said main valve may be reopened under manual control by line pressure at said inlet side acting on said closure member after automatic closure by the pilot valve.

2. Fluid flow control means, comprising: a main valve having an inlet side, an outlet side, a pressure chamber and a fluid pressure operable closure member moveable to closed position against line pressure at said inlet side in response to fluid pressure in said pressure chamber; means connecting a source of operating fluid to the pressure chamber of said main valve; a normally closed automatic pressure-responsive pilot valve connected in said last-mentioned means; pressure-responsive means in said pilot valve connected to the outlet side of said main valve, said pressure-responsive means being operable to open said pilot valve in response to a predetermined pressure condition at the outlet side of said main valve to thereby permit the flow of operating fluid to the pressure chamber of said main valve for automatically closing said main valve; means for manually shutting off the flow of operating fluid through said pilot valve to the pressure chamber of said main valve; and means for continuously venting operating fluid from the pressure chamber of said main valve, whereby said main valve may be reopened under manual control by line pressure at said inlet side acting on said fluid pressure operable member after automatic closure.

3. Fluid flow control means, comprising: a fluid pressure operable main valve having an inlet side, an outlet side, a pressure chamber and a closure member moveable to closed position against line pressure at said inlet side by fluid pressure in said pressure chamber; an automatic pressure-responsive pilot valve having an inlet connected to a source of operating fluid and having an outlet connected with said pressure chamber, said pilot valve including an element for controlling the flow of operating fluid to said pressure chamber; pressure-responsive means in said pilot valve for controlling said element; means connecting one side of said pressure-responsive means to the outlet side of said main valve so that pressure derived from said outlet side of said main valve normally urges said pilot valve to a closed position; yieldable means exerting a force of set value acting upon said pressure-responsive means in opposition to the pressure derived from the outlet side of said main valve so that upon a drop in pressure on the outlet side of the main valve below the set value of said yieldable force the pilot valve opens to permit flow of operating fluid to said main valve; manually operable means on the inlet side of said pilot valve actuatable to interrupt the flow of operating fluid through said pilot valve to said main valve; and means for releasing pressure from said pressure chamber, whereby said main valve may be reopened under manual control by line pressure at said inlet side acting on said closure member after automatic closure by said pilot valve.

4. Fluid flow control means, comprising: a fluid pressure operable main valve having an inlet side, an outlet side and a closure element controlling flow therebetween; actuating means for operating said closure element in response to fluid pressure supplied to said actuating means; an automatic pressure-responsive pilot valve connected with said actuating means for controlling the flow of operating fluid to said actuating means; a diaphragm in said pilot valve having the opposite sides thereof respectively responsive to fluid pressure derived from the outlet side of said main valve and to yieldable means exerting a force of set value, said diaphragm being operable to open and close said pilot valve in response to pressures at the outlet side of said main valve below and above the set value of said yieldable means, respectively; manually operable means actuatable to interrupt the flow of operating fluid through said pilot valve to said actuating means; and vent means for continuously exhausting operating fluid from said actuating means to a zone of relatively low pressure, said manually operable means in cooperation with said vent means thus permitting reopening of said main valve under manual control at a desired time after automatic closure.

5. Fluid flow control means, comprising: a fluid pressure operable main valve having an inlet side and an outlet side, said main valve including a closure element; means operable to move said closure element into closed position in response to an operating fluid pressure supplied to said closure operating means; an automatic pressure-responsive pilot valve; means connecting a source of the operating fluid to said closure operating means through said pilot valve; a normally closed element in said pilot valve for controlling the supply of operating fluid to said closure operating means; a diaphragm in said pilot valve having the opposite sides thereof respectively responsive to fluid pressure derived from the outlet side of said main valve and to yieldable means exerting a force of set value, said diaphragm being connected to said controlling element and operable to enable actuation of said controlling element by said yieldable means to automatically open said pilot valve in response to a predetermined minimum fluid pressure at the outlet side of said main valve and to thereby automatically close said main valve; manually controlled means for manually interrupting the flow of operating fluid to said pilot valve; and means for continuously venting operating fluid from said closure operating means to a zone of relatively low pressure, whereby said main valve may be reopened by operation of said manually controlled means after automatic closure by said pilot valve.

6. Fluid flow control means, comprising: a main valve having an inlet side, an outlet side, a pressure chamber and a fluid pressure operable closure member; an automatic pressure-responsive pilot valve having an inlet and having an outlet connected to said pressure chamber, said pilot valve including an element for controlling the supply of operating fluid to said pressure chamber; a pressure-operable means for controlling said element; means connecting one side of said pressure-operable means to the outlet side of said main valve; yieldable means of set value in said pilot valve acting on said pressure-operable means in opposition to the fluid pressure derived from the outlet side of said main valve, said control element and pressure-operable means being actuated in response to fluid pressure derived from the outlet of said main valve above the set value of said yieldable means to close said pilot valve to prevent the flow of operating fluid to said pressure chamber and to pressures below said set value to open said pilot valve and thereby permit the flow of operating fluid to said pressure chamber; means for releasing pressure from said pressure chamber; and manually operable means on the inlet side of said pilot valve for interrupting the supply of operating fluid under pressure through said pilot valve to said main valve.

7. Fluid flow control means, comprising: a main valve having an inlet side, an outlet side, a pressure chamber and a fluid pressure operable closure member; an automatic pressure-responsive pilot valve connected to said pressure chamber and including an element for controlling the supply of an operating fluid from a source to said pressure chamber; pressure-operable means for controlling said element; means connecting one side of said pressure-operable means to the outlet side of said main valve, whereby fluid pressure at the outlet side of said main valve acts upon said pressure-operable means; yieldable means of set value in said pilot valve acting upon said pressure-operable means in opposition to the fluid pressure derived from the outlet side of said main valve, said control element and pressure-operable means being movable in response to pressure derived from the outlet side of said main valve above the set value of said yieldable means to close said pilot valve and thereby prevent the flow of said operating fluid to said pressure chamber and being responsive to said yieldable means at fluid pressures below said set value to open said pilot valve and permit the flow of said operating fluid to said pressure chamber; restricted vent means for permitting the continuous exhaust of operating fluid from said pressure chamber; and a manually controlled valve connected between said pilot valve and the source of operating fluid, said manually controlled valve being operable to close said pilot valve and interrupt the flow of said operating fluid to said pilot valve, thus permitting said main valve to reopen and reestablishing flow therethrough after said main valve has been automatically closed by said pilot valve.

8. Fluid flow control means, comprising: a main valve having an inlet side and an outlet side and fluid-pressure-responsive means for controlling flow therebetween; a pressure-responsive pilot valve having an element controlling a supply of operating fluid from a source to said fluid-pressure responsive means; a diaphragm for operating said element, said diaphragm having one side thereof subject to the pressure of the outlet side of said main valve and the other side thereof subject to yieldable means exerting a predetermined set pressure, said diaphragm and control element being operable in response to fluid pressure derived from the outlet side of said main valve above said predetermined set pressure to close said pilot valve and prevent the flow of operating fluid to said fluid-pressure-responsive means of said main valve and being responsive to the force of said yieldable means when said fluid pressure from the outlet side of said main valve falls below said predetermined set pressure to open said pilot valve and thereby permit the flow of operating fluid to said main valve; means for continuously venting said operating fluid from the fluid-pressure-responsive means of said main valve at a rate lower than the supply rate thereto; and manually operable means between said pilot valve and the source of operating fluid, said manually operable means being actuatable to interrupt the supply of operating fluid to said main valve and thus enable operating fluid to exhaust from said main valve through said venting means, whereby said main valve may reopen and flow may be reestablished therethrough after said main valve has been automatically closed by said pilot valve.

9. Fluid flow control means, comprising: a main valve having an inlet side, an outlet side, a pressure chamber for operating fluid and a closure member responsive to fluid pressure in said chamber; a conduit for supplying operating fluid from a source of supply to said pressure chamber; an automatic pressure-responsive pilot valve connected in said conduit including an element for controlling the supply of operating fluid to the pressure chamber of said main valve; a diaphragm operatively connected to said element; means providing a pilot valve pressure chamber on one side of said diaphragm, means connecting said pilot valve pressure chamber to the outlet side of said main valve so that fluid pressure at the outlet side of the main valve normally urges said pilot valve to a closed position; yieldable means exerting a force of set value upon said diaphragm in opposition to the pressure in said pilot valve pressure chamber so that said pilot valve automatically opens in response to an opposing pressure in said chamber less than said set value, thereby permitting flow of operating fluid to the pressure chamber of the main valve; means for continuously venting operating fluid from the pressure chamber of said main valve at a rate lower than the supply rate of operating fluid through the open pilot valve; and a manually operable valve in the conduit for supplying operating fluid through said pilot valve to said main valve, said manually operable valve being actuatable to interrupt the flow of operating fluid to said pilot valve, whereby operating pressure is released from the main valve pressure chamber by exhaust of operating fluid through said venting means and allow opening of the main valve.

10. Fluid flow control means, comprising: a fluid pressure operable main valve having an inlet side and an outlet side, a pressure chamber for operating fluid and a closure member responsive to fluid pressure in said pressure chamber; a conduit for supplying operating fluid from a source to said pressure chamber; an automatic pressure-responsive pilot valve connected in said conduit; a closure member in said pilot valve controlling the supply of operating fluid to the pressure chamber of said main valve; a diaphragm in said pilot valve operatively connected to said pilot valve closure member; means defining a pilot valve pressure chamber on one side of said diaphragm; means connecting said pilot valve pressure chamber to the outlet side of said main valve, whereby fluid pressure derived from the outlet side of said main valve is operable upon said diaphragm to urge said pilot valve closure member into a closed position; yieldable means exerting a force of a predetermined value upon said diaphragm in opposition to the pressure derived from said outlet side of said main valve for urging said closure means into an open position, whereby said pilot valve operates to automatically close said main valve upon a predetermined minimum pressure in said pressure chamber; means for continuously venting operating fluid from the pressure chamber of said main valve at a rate lower than the supply rate of operating fluid through the open pilot valve; and manually controlled means between said pilot valve and the source of operating fluid, said manually controlled means being actuatable to interrupt the supply of operating fluid through said pilot valve to said main valve pressure chamber to permit the operating fluid to exhaust from said main valve through said venting means and allow the opening of said main valve.

11. Fluid flow control means, comprising: a fluid pressure operable main valve including an inlet side, an outlet side, a pressure chamber, and a closure member responsive to pressure in said pressure chamber; an automatic pressure-responsive pilot valve for controlling the supply of operating fluid to the pressure chamber of said main valve, said pilot valve including a body having a inlet and an outlet and a closure member for controlling flow therebetween, a diaphragm operatively connected with said closure member, means defining a pilot valve pressure chamber on one side of said diaphragm; means connecting the inlet of said pilot valve with the inlet side of said main valve; means connecting the outlet of said pilot valve with the pressure chamber of said main valve; restricted orifice means for venting operating fluid from the pressure chamber of said main valve to a zone of relatively low pressure; means connecting the pressure chamber of said pilot valve to the outlet side of said main valve so that pressure derived from the outlet side of said main valve normally urges said pilot valve closure member to a closed position; yieldable means of set value in said pilot valve acting upon the pilot valve diaphragm in opposition to the fluid pressure of said pilot valve pressure chamber so that said pilot valve automatically opens in response to a fluid pressure in said pilot valve pressure chamber less than said opposing set value; and manually operable valve means in the connecting means between said pilot valve inlet and the inlet side of said main valve.

12. Fluid flow control means, comprising: a fluid pressure operable main valve including an inlet side, an outlet side, a pressure chamber and a closure member responsive to pressure in said chamber; a fluid pressure operable pilot valve for controlling the supply of operating fluid to said main valve, said pilot valve including a body having an inlet, and outlet, a closure member for controlling flow therebetween, and a restricted vent in said body; a diaphragm operatively connected with said pilot valve closure member; means defining a pressure chamber on one side of said diaphragm; means connecting the inlet side of said pilot valve with the inlet side of said main valve; means connecting the outlet side of said pilot valve with the pressure chamber of said main valve; means connecting the pressure chamber of said pilot valve to the outlet side of said main valve so that pressure derived from the outlet side of the main valve normally urges said pilot valve closure member to a closed position; yieldable means of set value in said pilot valve exerting a force acting upon the pilot valve diaphragm in opposition to the fluid pressure of said pressure chamber so that said pilot valve automatically opens in response to a pressure in said pressure chamber below said set value; and manually operable valve means in said means connecting the inlet side of said pilot valve with the inlet side of said main valve, whereby the flow of operating fluid from said main valve to said pilot valve may be manually shut off and pressure in said pressure chamber of said main valve may be released by venting operating fluid through said restricted vent to thereby permit said main valve to open.

13. Fluid flow control means, comprising; a main valve having an inlet chamber, an outlet chamber, a pressure chamber for operating fluid, and a fluid pressure operable element subject to the pressure in said pressure chamber for controlling flow between said inlet and outlet chambers; an automatic pressure-operable pilot valve having an inlet and an outlet; means connecting the inlet of said pilot valve with the inlet chamber of said main valve; means connecting the outlet of said pilot valve with the pressure chamber of said main valve, said pilot valve comprising a valve element operable to control flow through said pilot valve between said inlet and outlet; a diaphragm connected with said valve element by a valve stem, said pilot valve having a pressure chamber on one side of said diaphragm so that pressure therein acts upon said diaphragm to urge said valve element to a valve-closed position; means connecting said pilot valve pressure chamber with the outlet chamber of said main valve; and yieldable means exerting a force of set value on said diaphragm in opposition to the fluid pressure in said pilot valve pressure chamber so that said pilot valve automatically opens in response to a pressure in the outlet chamber of said main valve less than the set value of said yieldable means to permit the flow of operating fluid through the pilot valve from said inlet chamber of the main valve to the pressure chamber of said main valve and thereby cause said main valve to close.

14. Fluid flow control means, comprising: a main valve having an inlet chamber, an outlet chamber, a pressure chamber for operating fluid and a fluid pressure operable element subject to the pressure in said pressure chamber for controlling flow between said inlet and outlet chambers; an automatic pressure-operable pilot valve having an inlet and an outlet; means connecting the inlet of said pilot valve with the inlet chamber of said main valve; means connecting the outlet of said pilot valve with the pressure chamber of said main valve, said pilot valve comprising a valve element operable to control flow through said pilot valve and a diaphragm connected with said valve element, said pilot valve having a pressure chamber on one side of said diaphragm so that pressure therein acts upon said diaphragm to urge said valve element into a valve-closed position; means connecting said pilot valve pressure chamber with the outlet chamber of said main valve; yieldable means exerting a force of set value on said diaphragm in opposition to the fluid pressure in said pilot valve pressure chamber so that said pilot valve is automatically operable to closed position to permit the supply of operating fluid from said inlet chamber of the main valve to the pressure chamber of said main valve in response to fluid pressure in said pilot valve pressure chamber less than the set minimum pressure exerted by said yieldable means; means defining a restricted orifice in the outlet side of said pilot valve for continuously venting fluid supplied to said main valve at a rate less than the normal supply rate through the open pilot valve; and a manually operable valve in said means connecting the inlet side of the pilot valve with the inlet chamber of said main valve, whereby the flow of operating fluid from said inlet chamber through said pilot valve to the pressure chamber of said main valve may be manually shut off permitting pressure therein to be released by venting operating fluid through said restricted orifice thereby permitting said main valve to open after it has been automatically closed by the pilot valve.

15. Fluid flow control means, comprising: a fluid pressure operable main valve including an inlet side, an outlet side, a pressure chamber and a fluid pressure operable closure member responsive to pressure in said pressure chamber; a conduit connecting the inlet side of said main valve to said main valve pressure chamber, whereby operating fluid for closing said valve is derived from the inlet side of said main valve; an automatic pressure-responsive pilot valve in said conduit having a valve closure for controlling the flow of operating fluid therethrough; a conduit connecting said pilot valve with the outlet side of said main valve and means normally urging said pilot valve closure to a closed position by pressure derived from the outlet side of said main valve; yieldable means in said pilot valve exerting a force of set value in opposition to the pressure derived from the outlet side of said main valve so that the pilot valve is automatically opened in response to a pressure at the outlet side of said main valve less than said set value of said yieldable means; means in said pilot valve downstream of said valve closure for continuously venting operating fluid at a rate lower than the normal supply rate to said main valve; and a manual valve in the conduit between the inlet side of the main valve and the pilot valve, said manual valve being operable to shut off flow of said operating fluid so that the main valve may reopen under line pressure at said inlet side acting on said closure member after it has been automatically closed by the pilot valve.

References Cited in the file of this patent

UNITED STATES PATENTS

| | | |
|---|---|---|
| 597,810 | Blanc | Jan. 25, 1898 |
| 784,408 | Krichbaum | Mar. 7, 1905 |
| 1,184,761 | Lytton | May 30, 1916 |
| 1,328,277 | Fulton | Jan. 20, 1920 |
| 2,377,227 | Griswold | May 29, 1945 |
| 2,583,006 | Niesemann | Jan. 22, 1952 |

FOREIGN PATENTS

| | | |
|---|---|---|
| 16,318 | Great Britain | Aug. 10, 1899 |
| 34,481 | Holland | Jan. 15, 1935 |